Figure 1:
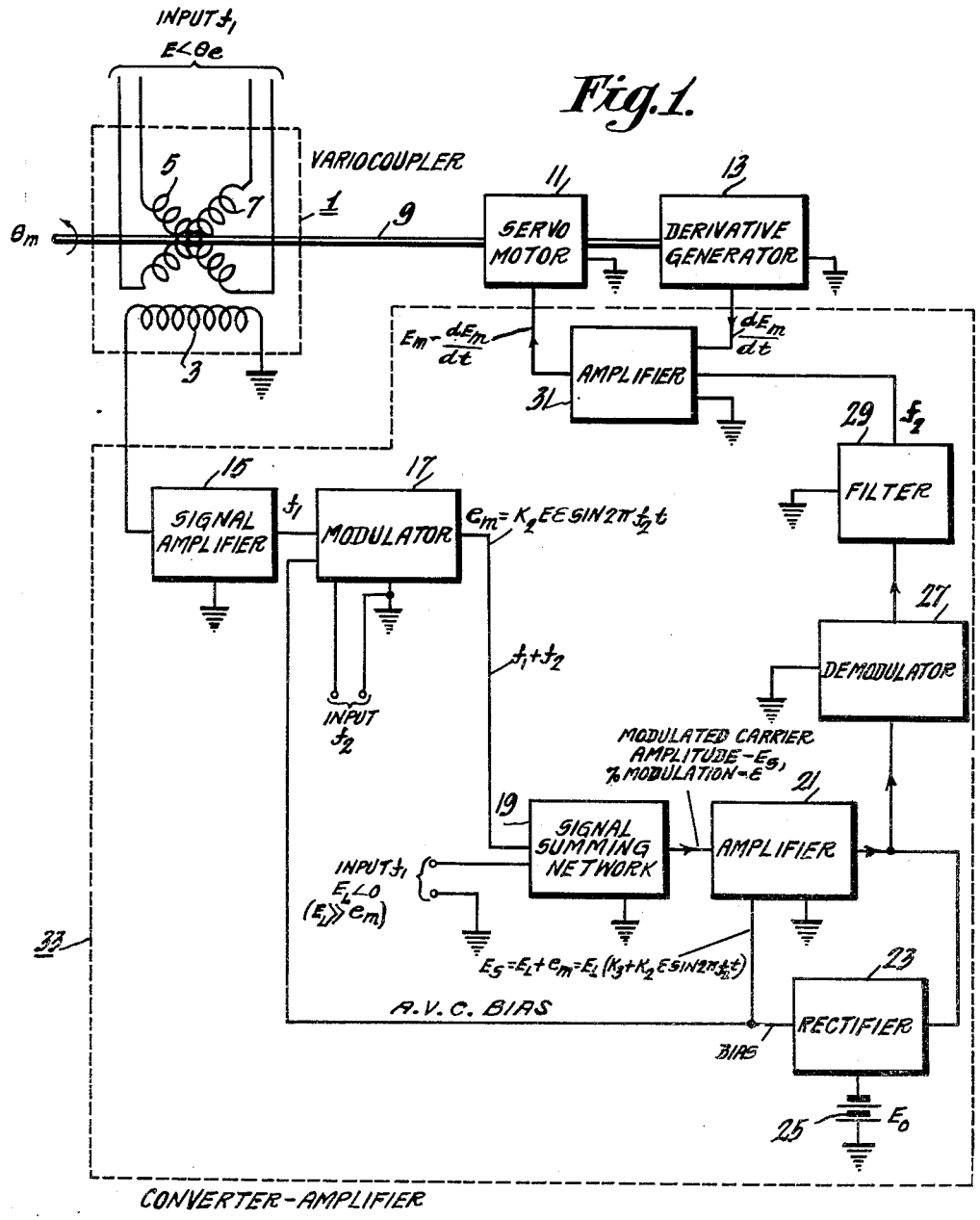

Patented Mar. 13, 1951

2,544,921

UNITED STATES PATENT OFFICE 2,544,921

ENERGIZING CIRCUIT FOR SERVO SYSTEMS

Maurice Leighton Greenough, Groveland, Mass., assignor to Radio Corporation of America, a corporation of Delaware Application September 28, 1945, Serial No. 619,240

11 Claims. (Cl. 318—28)

This invention relates generally to electrical servo systems and more particularly to an improved energizing circuit for servo mechanisms for converting an electrical phase angle to a mechanical angle of rotation.

In electronic computing systems for solving ballistic functions in the process of sighting a gun at a remote, fixed or movable target, it is customary to convert the polar coordinates of the present position and course of the target to electrical voltages having magnitudes corresponding to the values of the Cartesian coordinates of the future target position as determined by the target velocity and by the ballistic characteristics of the weapon. The gun azimuth and elevation for deriving the proper trajectory for aiming the weapon at the future target position are converted from Cartesian coordinates in the horizontal and vertical planes to polar coordinates in said planes. The actual gun pointing is accomplished by synchronized motor actuated by servomotor mechanisms which are responsive to voltages corresponding to the angular components of the polar coordinates of the future target position.

For example, the gun azimuth is obtained by impressing upon the perpendicularly disposed rotor coils of a precision variocoupler the potentials derived from the electronic computer mechanism representing the future ground plane coordinates. Since the rotor coils are at right angles to each other, the intensity of the field established by them is proportional to the future ground range, and is spatially at an angle to the zero plane of the rotor windings which is equal to the future azimuth angle. The voltage induced in a fixed stator winding of the variocoupler, therefore, is proportional to the horizontal range and to the sine of the angle between the resultant field of the rotor windings and a plane perpendicular to the axis of the fixed stator winding.

The servomotor and the variocoupler rotor are mounted upon or geared to a common rotatable shaft. The output voltage derived from the variocoupler stator winding is applied to a converter-amplifier circuit which drives the servomotor in a direction which tends to reduce the stator voltage of the variocoupler to a zero value. In other words, the variocoupler rotor is rotated by the servomotor until the resultant field of the rotor windings is perpendicular to the axis of the stator winding, whereby the shaft is rotated through an angle equal to the azimuth angle. Correction voltages for windage and drift may be added in series with, or coupled to the output voltage of the stator winding whereby such corrections may be effectively added to the normal azimuth angle. The resolving variocoupler and servomotor are coupled to synchronous motor units for coarse control of the gun pointing. Finer control of the gun pointing is obtained by other synchronous motors differentially connected to the coarse motor control and having a relatively high ratio of angular displacement to that of the variocoupler shaft.

The instant invention is an improvement upon the systems disclosed and claimed in applicant's copending U. S. applications Serial No. 619,398, filed September 29, 1945, now Patent Number 2,528,512, patented November 7, 1950, and Serial No. 619,399, filed September 29, 1945. It comprises a novel converter-amplifier circuit interposed between the resolving variocoupler stator winding and the servomotor. It includes a circuit which is responsive to the relatively high computer frequency (for example, 2615 cycles) and to the power line frequency (60 cycles) for deriving a signal of the power line frequency which varies in amplitude substantially only as a function of the unbalance of the rotor and stator of the variocoupler. The novel converter-amplifier circuit includes a modulator for combining signals derived from the variocoupler stator with signals of the motor energizing frequency. The modulated signals are additively combined with high amplitude input computer signals to derive a second modulated signal having a percentage of modulation of the motor energizing frequency which is proportional to the degree of unbalance of the variocoupler rotor. The gain of the second modulated signal is controlled inversely as a function of the magnitude of the input signals by an automatic volume control network for stabilizing the loop gain of the circuit in order that the servomotor energizing currents may be substantially independent of variations in the amplitude of the variocoupler rotor currents.

The instant system utilizes a single variable gain amplifier for currents of both frequencies as compared to the system disclosed in the first of said copending applications which requires two separate variable gain amplifiers in a circuit having a widely differing operational sequence.

In order to minimize hunting and overshooting by the servomotor, apparatus is provided for generating a correction current which is proportional to the rate of change of the servomotor energizing current. The correction current is effectively substracted from the normal servomotor energizing current. This feature provides maximum starting and stopping torque while preventing abnormally high motor acceleration during the remainder of the time during which servomotor is rotated. This device is disclosed and claimed in applicant's copending U. S. application Serial No. 619,241, filed September 28, 1945, now Patent Number 2,497,216, patented February 14, 1950, assigned to the same assignee as the instant application.

The correction current generating circuit comprises a rotary differentiating voltage generator, the rotor of which may be separately driven by the servomotor energizing current or which may be connected directly to, or geared to, the servomotor shaft. The field of the generator is excited by currents of the same frequency as that of the servomotor energizing current. The differentiating current generator may comprise any well known type of rotary motor apparatus such as a two-phase motor, wherein the output voltage is directly proportional to the rate of change of the generator shaft angular velocity. This type differentiating current generator is superior to other types of reactive or passive networks in that the derivative signals generated thereby may be of relatively higher power or voltage. The servomotor may be a conventional shaded-pole reversible motor or any other of the types employed in conventional servo systems.

Among the objects of the invention are to provide an improved method of and means for operating servomotor systems. Another object is to provide an improved servomotor system having an inverse gain control circuit providing a constant system loop gain.

An additional object is to provide a signal frequency conversion system wherein an unbalanced input signal controls the modulation percentage of signals of a second frequency which modulate said input signals, and wherein the modulation percentage determines the amplitude of an output signal of the second frequency.

Another object is to provide an improved converter circuit for converting voltages derived from an unbalanced variocoupler to energizing voltages of a different frequency for actuating a servo mechanism to balance said variocoupler. A further object is to provide an improved converter circuit for a servo energizing network which is independent of the signal level in the servo control portion of said converter circuits. An additional object is to provide a servo energizing converter circuit utilizing a single variable gain amplifier, the complete circuit having constant loop gain. Another object is to provide a frequency conversion system for energizing a servo system by currents of a first frequency in response to unbalance of currents of a second frequency.

A further object is to provide an improved servo system having a converter-amplifier circuit for converting an electrical phase angle to a mechanical angle of rotation of the servo mechanism and an anti-hunt circuit comprising a differentiating voltage network responsive to the servomotor energizing potential for generating a stabilizing voltage proportional to the rate of change of the energizing voltage, wherein said stabilizing voltage is subtracted from the servomotor energizing voltage. An additional object is to provide an improved servomotor energizing and stabilizing voltage network including a resolving variocoupler for converting the Cartesian coordinates of a position to voltages representing the angular component of the polar coordinates of said position, a circuit for converting said voltages to provide angular rotation of said motor, means for generating and subtracting from the energizing voltage a stabilizing voltage proportional to the first derivative of said energizing voltage, for providing a driving voltage for a servo mechanism, and means coupling the servo mechanism to the variocoupler to balance said variocoupler.

Figure 2:
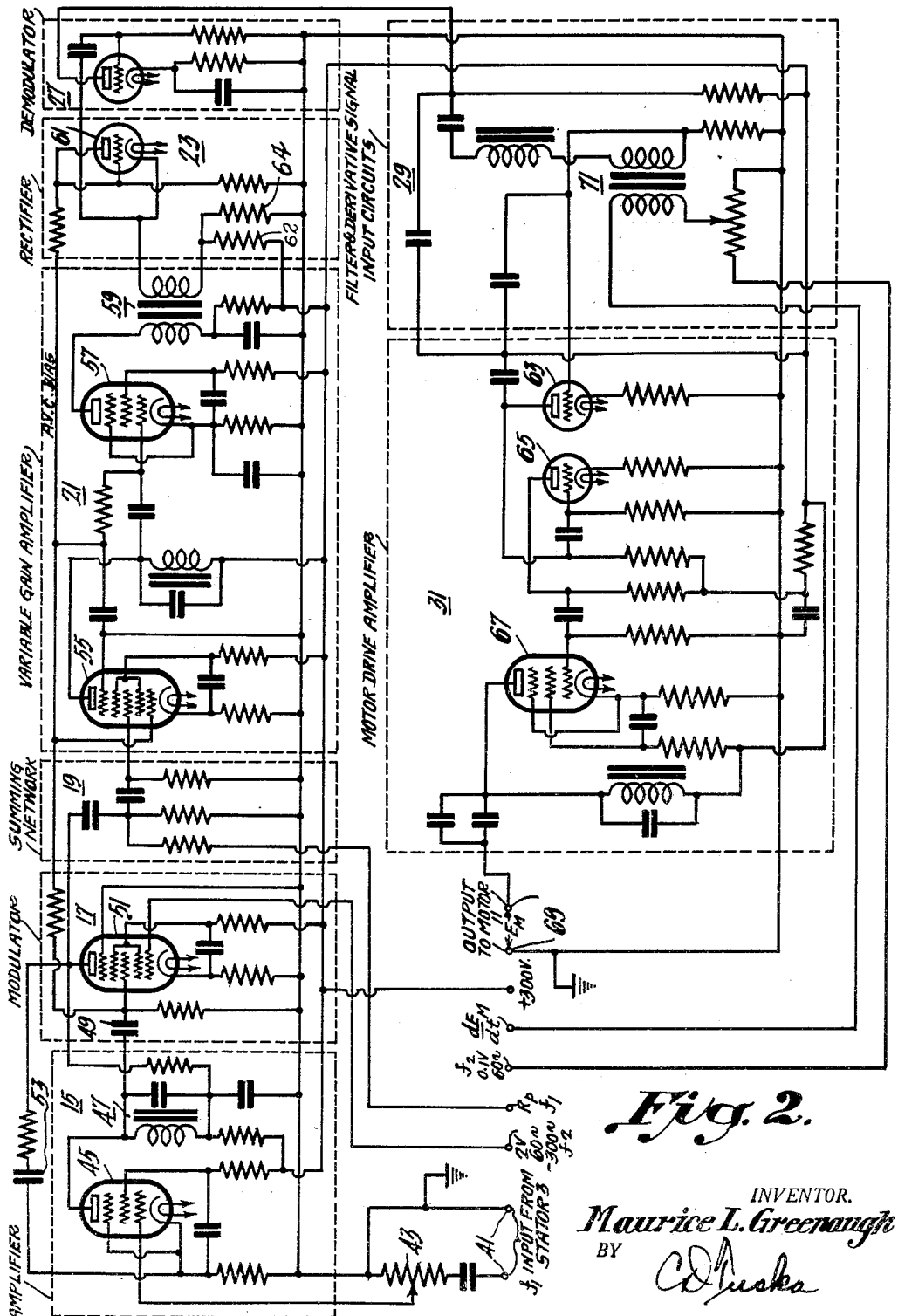

The invention will be described in greater detail by reference to the accompanying drawings of which Figure 1 is a block schematic circuit diagram of a servo control system including a preferred embodiment of the invention, and Figure 2 is a schematic circuit wiring diagram of said preferred embodiment of the invention. Similar reference characters are applied to similar elements throughout the drawings.

Referring to Figure 1, a servomotor control and stabilizing network includes a variocoupler type resolving device, a converter-amplifier for controlling the servo energizing currents as a function of the unbalance of the variocoupler, a servomotor, and a derivative generator for stabilizing the operation of the servomotor. The variocoupler 1 is of the precision type including a fixed stator winding 3 and a pair of perpendicularly-disposed rotatable rotor windings 5 and 7. The rotor shaft 9 of the variocoupler 1 is coupled to the armature of a servomotor 11 and to the armature of a derivative voltage generator 13. Input signals to the servo system applied to the rotor windings 5 and 7 correspond to the values of the Cartesian coordinates of a position to which the servo system is to be adjusted. The input voltages have a magnitude E at an electrical phase angle $\theta_e$.

It is desirable that the system shall have an operating characteristic which is substantially independent of the magnitude E of the input voltages since it is essential that the servomotor torque be proportional only to the angular deviation of the variocoupler rotor from balance. Therefore a converter-amplifier system is provided for deriving energizing currents for the servo motor which are a function only of the angular deviation of the variocoupler rotor from balance. Such currents or signals are herein identified as unbalance currents or signals, and the magnitudes thereof are identified as the degree of unbalance.

A linear signal amplifier 15 responsive to the output voltage $E_v$ of the variocoupler stator winding 3 provides a signal at the frequency $f_1$ having a magnitude $$E_v = KE \sin \epsilon \tag{1}$$

where $\epsilon$ is the angular deviation from balance of the variocoupler rotor. For small values of $\epsilon$, $\sin \epsilon = \epsilon$. The term $\epsilon$ will be employed herein, but $\sin \epsilon$ should be substituted for $\epsilon$ for any but small values of $\epsilon$. The signal derived from the amplifier 15 is applied to the input circuit of a modulator 17. Signals of a second frequency $f_2$, (such as the power line frequency of 60 cycles) also are applied to the modulator 17. The combined signal frequency components $f_1$ and $f_2$ at a voltage $e_m$ derived from the modulator 17 are applied to a signal summing network 19 to which also are applied input signals $E_L \angle \theta_e$ having a frequency where $E_L \gg e_m$.

Thus signals of the frequency $f_1$ having a percentage modulation of the frequency $f_2$ proportional to the angular deviation from balance $\epsilon$ of the variocoupler rotor are derived from the summing network 19 and are applied to a variable gain amplifier 21. This condition obtains since the input signal $E_i$ applied to the modulator is:

$$E_i = K_1 E_\epsilon \qquad (2)$$

and the output signal $e_m$ derived from the modulator and applied to the signal summing network is:

$$e_m = K_2 E_\epsilon \sin 2\pi f_2 t = K_m \sin \omega_m t \qquad (3)$$

Thus signals $E_s$ derived from the summing network are:

$$E_s = E_L + e_m = E_L(K_3 + K_{2\epsilon} \sin 2\pi 60 t) \qquad (4)$$
$$= K_s \sin \omega_s t$$

where $E_L \gg e_m$, and $K_m$, $K_s$, $K_2$ and $K_3$ are constants.

Signals from the variable gain amplifier 21 are applied to a rectifier 23. The rectifier 23 is biased by a battery 25 which represents a source of reference potential $E_0$. Signals derived from the rectifier 23 thus have voltage magnitudes corresponding to the difference of the magnitudes of the rectified signal components and the reference potential $E_0$. The difference signal thus obtained is employed as automatic bias control voltage which is applied through a long time constant circuit to the variable gain amplifier 21 whereby the gain of the amplifier is inversely proportional to the signal magnitude of the $f_1$ carrier signal components applied thereto. The output level of the variable gain amplifier 21 for the carrier component $f_1$ of the modulated signal will be substantially constant.

The carrier controlled modulated signal derived from the variable-gain amplifier 21 is applied to a demodulator 27 which removes the $f_1$ carrier signal component and provides an $f_2$ signal proportional in magnitude to the angular deviation from balance $\epsilon$ of the variocoupler rotor. The $f_2$ signal from the demodulator is selected by a low-pass filter 29 for operation of the motor.

The low frequency component $f_2$ derived from the filter 29 is applied to the input of a motor drive amplifier 31, the output of which is connected to the armature of the servomotor 11 to rotate the servomotor and the rotor windings 5 and 7 of the variocoupler 1 in a direction to balance the variocoupler. Such balance obtains when the resultant field of the rotor windings 5 and 7 is perpendicular to the axis of the stator winding 3 of the variocoupler. The derivative voltage $$\frac{dE_M}{dt}$$

derived from the derivative generator 13 coupled to the motor 11 is proportional in magnitude to the rate of change of angular velocity of the variocoupler shaft 9, and is applied in phase opposition to the $f_2$ input voltages applied to the motor amplifier 31 for stabilizing the operation of the servomotor and for minimizing hunting or overshooting thereof.

The circuit of Fig. 2 shows the components of the portion of the circuit of Fig. 1 within the dash line block 33. Input signals of the frequency $f_1$ derived from the stator winding 3 are applied to the terminals 41. The terminals 41 are coupled through a potentiometer 43 to the control electrode of a pentode amplifier tube 45. The anode circuit of the pentode amplifier tube 45 includes a parallel resonant circuit 47, and is coupled through a series capacitor 49 to the second control electrode of a heptode modulator tube 51. A negative feedback circuit 53 couples the anode of the modulator tube 51 to the cathode of the input amplifier tube 45.

Signals of the motor energizing frequency $f_2$ are applied to the first control electrode of the modulator 51. Signals derived from the anode of the modulator tube 51 are applied to the signal summing network 19 where they are combined with signals of the frequency $f_1$ of a magnitude proportional to the quadrature sum of the rotor currents of the variocoupler. The combined signals from the summing network 19 comprise a carrier of the frequency $f_1$ modulated by the motor energizing frequency $f_2$, the percentage of modulation being proportional to the angular deviation from balance of the variocoupler rotor. The combined signals are applied to the second control electrode of a first variable gain amplifier hetrode tube 55. The variable gain amplifier 21 includes the first hetrode 55 which is coupled to a second pentode tube 57. The output of the second pentode amplifier tube 57 is coupled through a transformer 59, to a signal rectifier triode 61 and to the demodulator 27.

The rectifier tube 61 is a triode, having its grid and anode connected together, and having its cathode biased by the source of reference potential derived from the voltage divider 62, 64 connected across the anode voltage source. The bias voltage derived from the rectifier tube 61 proportional to the difference of the rectified signals and the reference potential is applied to the first control electrodes of the variable gain amplifier tubes 55 and 57 and to the second control electrode of the modulator tube 51. Thus, the output signals derived from the variable gain amplifier 21 have a constant carrier frequency level.

Signals from the transformer 59 are detected by the demodulator 27 which removes the carrier frequency component. The motor energizing frequency demodulation component $f_2$ is selected by the filter network 29 and applied to the input of the motor drive amplifier 31 which includes a pair of triodes 63, 65 and a power pentode 67. The anode circuit of the power pentode 67 is connected to the motor energizing output terminals 69. The derivative voltage $$\frac{dE_M}{dt}$$

is coupled to the input of the first motor drive amplifier tube 63 through a second transformer 71 for combining the derivative signal and the demodulated signal in phase opposition.

Thus the invention disclosed comprises an improved frequency conversion circuit for coupling a resolving variocoupler to the servo mechanism for rotating the variocoupler rotor through an angle required to balance the resultant rotor field with respect to the fixed variocoupler stator winding. The rotor unbalance currents control the percentage of modulation of the computer frequency by the motor energizing frequency. A single variable-gain amplifier is employed for controlling the carrier frequency level and for stabilizing the loop gain of the system. A demodulator separates the carrier and modulation frequency components and provides a motor energizing current proportional in magnitude to the percentage of modulation and hence to the angular deviation from balance of the variocoupler rotor. A derivative generator is included for stabilizing the acceleration of the servomotor.

I claim as my invention:

1. In a constant loop gain frequency conversion system for a source of unbalanced input signals of a first frequency including a source of signals of a second frequency, the method comprising the steps of deriving control signals of said first frequency having magnitudes proportional to the degree of unbalance of said input signals, combining said control signals, said input signals and said second frequency signals to derive a modulated signal having a percentage of modulation of said second frequency signals proportional to the magnitude of said control signals, and detecting said second frequency modulation component from said modulated signals to derive an output signal of said second frequency proportional in magnitude to the degree of unbalance and substantially independent of the magnitude of said first frequency input signals.

2. In a constant loop gain frequency conversion system for a source of unbalanced input signals of a first frequency including a source of signals of a second frequency, the method comprising the steps of deriving control signals of said first frequency having magnitudes proportional to the degree of unbalance of said input signals, combining said control signals, said second frequency signals and said input signals to derive a modulated signal having a percentage of modulation of said second frequency signals proportional to the magnitude of said control signals, maintaining substantially constant said input first frequency carrier component of said modulated signals to control the gain of said second frequency component of said combined signals, and detecting said second frequency modulation component of said controlled signals to derive an output signal of said second frequency proportional in magnitude to the degree of unbalance and substantially independent of the magnitude of said first frequency input signals.

3. In a constant loop gain frequency conversion system for a source of unbalanced input signals of a first frequency including a source of signals of a second frequency, the method comprising the steps of deriving control signals of said first frequency having magnitudes proportional to the degree of unbalance of said input signals, modulating said control signals and said second frequency signals, combining said modulated signals and said input signals to derive a combined modulated signal having a percentage of modulation of said second frequency signals proportional to the magnitude of said control signals, amplifying said combined modulated signals, rectifying amplified signals of said input first frequency component of said combined modulated signals to derive a control bias voltage, applying said bias voltage to control the amplification gain of said amplified second frequency component of said combined signals, demodulating said combined amplified signals, and deriving from said demodulated signals an output signal of said second frequency proportional in magnitude to the degree of unbalance and substantially independent of the magnitude of said first frequency input signals.

4. In a constant loop gain frequency conversion system for a source of unbalanced input signals of a first frequency including a source of signals of a second frequency, the method comprising the steps of deriving control signals of said first frequency having magnitudes proportional to the degree of unbalance of said input signals, modulating said control signals and said second frequency signals, additively combining relatively low magnitudes of said modulated signals and relatively high magnitudes of said input signals to derive a combined modulated signal having a percentage of modulation of said second frequency signals proportional to the magnitude of said control signals, amplifying said combined modulated signals, rectifying amplified signals of said input first frequency component of said combined modulated signals to derive a control bias voltage, applying said bias voltage to control the gain of said amplified signals, demodulating said combined amplified signals, and deriving from said demodulated signals an output signal of said second frequency proportional in magnitude to the degree of unbalance and substantially independent of the magnitude of said first frequency input signals.

5. A constant loop gain frequency conversion system including a source of unbalanced input signals of a first frequency, a source of signals of a second frequency, means for deriving from said input signals control signals of said first frequency having magnitudes proportional to the degree of unbalance of said input signals, means for combining said control signals, said second frequency signals and said input signals to derive a modulated signal having a percentage of modulation of said second frequency signals proportional to the magnitude of said control signals, and means for demodulating said modulated signals for deriving from said demodulated signals an output signal of said second frequency proportional in magnitude to the degree of unbalance and substantially independent of the magnitude of said first frequency input signals.

6. A constant loop gain frequency conversion system including a source of unbalanced input signals of a first frequency, a source of signals of a second frequency, means for deriving from said input signals control signals of said first frequency having magnitudes proportional to the degree of unbalance of said input signals, means for combining said control signals, said second frequency signals and said input signals to derive a modulated signal having a percentage of modulation of said second frequency signals proportional to the magnitude of said control signals, means for demodulating said modulated signals, means for deriving from said demodulated signals an output signal of said second frequency, and means for controlling the magnitude of said output signal inversely as the magnitude of said input signals to provide an output signal proportional in magnitude to the degree of unbalance and substantially independent of the magnitude of said first frequency input signals.

7. A constant loop gain frequency conversion system including a source of unbalanced input signals of a first frequency, a source of signals of a second frequency, means for deriving from said input signals control signals of said first frequency having magnitudes proportional to the degree of unbalance of said input signals, means for modulating said control signals and said second frequency signals, means for combining said modulated signals and said input signals to derive a combined modulated signal having a percentage of modulation of said second frequency signals proportional to the magnitude of said control signals, means for amplifying said combined modulated signals, means for rectifying amplified signals of said input first frequency component of said combined modulated signals to derive a control bias voltage, means for applying said bias voltage to control the gain of said amplifying means, means coupled to said amplifying means for demodulating said combined amplified signals, and means for deriving from said demodulated signals an output signal of said second frequency proportional in magnitude to the degree of unbalance and substantially independent of the magnitude of said first frequency input signals.

8. A constant loop gain frequency conversion servomotor system including a source of input signals of a first frequency, a source of signals of a second frequency, coupling means for deriving from said input signals control signals of said first frequency having magnitudes proportional to the degree of coupling therethrough of said input signals, means for modulating said control signals and said second frequency signals, means for combining said modulated signals and said input signals to derive a combined modulated signal having a percentage of modulation of said second frequency signals proportional to the magnitude of said control signals, means for amplifying said combined modulated signals, means for rectifying amplified signals of said input first frequency component of said combined modulated signals to derive a control bias voltage, means for applying said bias voltage to control the gain of said amplifying means, means coupled to said amplifying means for demodulating said combined amplified signals, means for deriving from said demodulated signals an output signal of said second frequency proportional in magnitude to the degree of coupling and substantially independent of the magnitude of said first frequency input signals, a servomotor, means for applying said output signals to energize said motor, and means coupling said motor to said input signal control means for adjusting the coupling therethrough of said input signals.

9. A constant loop gain frequency conversion system including a source of unbalanced input signals of a first frequency, a source of signals of a second frequency, means for deriving from said input signals control signals of said first frequency having magnitudes proportional to the degree of unbalance of said input signals, means for modulating said control signals and said second frequency signals, signal additive means for combining said modulated signals and said input signals to derive a combined modulated signal having a percentage of modulation of said second frequency signals proportional to the magnitude of said control signals, means for amplifying said combined modulated signals, means for rectifying amplified signals of said input first frequency component of said combined modulated signals, a source of reference potential, means responsive to the difference of the magnitudes of said rectified signals and said reference potential for deriving a control bias voltage, means for applying said bias voltage to control the gain of said amplifying means, means coupled to said amplifying means for demodulating said combined amplified signals, and means for deriving from said demodulated signals an output signal of said second frequency proportional in magnitude to the degree of unbalance and substantially independent of the magnitude of said first frequency input signals.

10. A constant loop gain frequency conversion system including a source of unbalanced input signals of a first frequency, a source of signals of a second frequency, means for deriving from said input signals control signals of said first frequency having magnitudes proportional to the degree of unbalance of said input signals, means for modulating said control signals and said second frequency signals, means for combining said modulated signals and said input signals to derive a combined modulated signal having a percentage of modulation of said second frequency signals proportional to the magnitude of said control signals, variable gain means for amplifying said combined modulated signals, means for rectifying amplified signals of said input first frequency component of said combined modulated signals, a source of reference potential, means for combining said rectified signals and said reference potential to derive a control bias voltage, means for applying said bias voltage to control the gain of said amplifying means, means coupled to said amplifying means for demodulating said combined amplified signals, and filter means for deriving from said demodulated signals an output signal of said second frequency proportional in magnitude to the degree of unbalance and substantially independent of the magnitude of said first frequency input signals.

11. A constant loop gain frequency conversion servomotor system including a source of input signals of a first frequency, a source of signals of a second frequency, variocoupler means for deriving from said input signals control signals of said first frequency having magnitudes proportional to the degree of coupling therethrough of said input signals, means for modulating said control signals and said second frequency signals, means for combining said modulated signals and said input signals to derive a combined modulated signal having a percentage of modulation of said second frequency signals proportional to the magnitude of said control signals, variable gain means for amplifying said combined modulated signals, means for rectifying amplified signals of said input first frequency component of said combined modulated signals, a source of reference potential, means for combining said rectified signals and said reference potential in opposite polarity to derive a control bias voltage, means for applying said bias voltage to control the gain of said amplifying means, means coupled to said amplifying means for demodulating said combined amplified signals, filter means for deriving from said demodulated signals an output signal of said second frequency proportional in magnitude to the degree of coupling and substantially independent of the magnitude of said first frequency input signals, a servomotor, means for applying said output signals to energize said motor, and means coupling said motor to said variocoupler to adjust the coupling between said variocoupler windings.

MAURICE LEIGHTON GREENOUGH.

REFERENCES CITED

The following references are of record in the file of this patent:

UNITED STATES PATENTS

| Number | Name | Date |
|---|---|---|
| 2,399,695 | Satterlee | May 7, 1946 |
| 2,436,807 | Isbister | Mar. 2, 1948 |
| 2,438,288 | Jacobson et al. | Mar. 23, 1948 |